US00RE36086E

United States Patent [19]

Hishida et al.

[11] E Patent Number: Re. 36,086

[45] Reissued Date of Patent: Feb. 9, 1999

[54] SPINDLE MOTOR

[75] Inventors: Noriaki Hishida, Kyoto; Kuniyasu Iwazaki, Naka-gun, both of Japan

[73] Assignee: Nidec Corporation, Kyoto, Japan

[21] Appl. No.: 328,499

[22] Filed: Oct. 25, 1994

Related U.S. Patent Documents

Reissue of:

[64] Patent No.: 5,160,866
Issued: Nov. 3, 1992
Appl. No.: 643,557
Filed: Jan. 18, 1991

U.S. Applications:

[62] Division of Ser. No. 480,277, Feb. 15, 1990, Pat. No. 5,045,738.

[30] Foreign Application Priority Data

Feb. 22, 1989 [JP] Japan ..... 1-43445
Nov. 25, 1989 [JP] Japan ..... 1-136218 U

[51] Int. Cl.[6] ..... H02K 5/16

[52] U.S. Cl. ..... 310/90; 310/67 R; 369/263

[58] Field of Search ..... 310/67 R, 90, 310/91, 156; 369/263, 269, 270

[56] References Cited

U.S. PATENT DOCUMENTS 4,701,651 10/1987 Tanaka ..... 310/90
4,713,704 12/1987 Voll et al. ..... 360/97
4,858,044 8/1989 Gapo ..... 360/99.8
4,900,958 2/1990 Kitahara et al. ..... 310/67 R
5,045,738 9/1991 Hishida et al. ..... 310/90
5,057,731 10/1991 Hancock ..... 310/180
5,061,868 10/1991 Iwazaki et al. ..... 310/67 R

*Primary Examiner*—Matthew V. Nguyen
*Attorney, Agent, or Firm*—McCormick, Paulding & Huber

[57] ABSTRACT

A spindle motor having a shaft member secured to a fitting member, a rotary member which is rotatable relatively to the shaft member, a rotor magnet fitted to the rotary member in such a manner that the rotor magnet confronts the rotor magnet and a stator, wherein a pair of inner annular grooves are formed in the shaft member, a pair of outer annular grooves are formed in the rotary member and a plurality of ball members are accommodated in ball-accommodating space defined by these annular grooves. A spindle motor having a fitting member having a hollow cylindrical portion, a shaft member which is rotatable relatively to the fitting member, a rotary member secured to the shaft member, a rotor magnet fitted to the rotary member and a stator disposed in such a manner that the stator confronts the rotor magnet, wherein a pair of inner annular grooves are formed in the shaft member, a pair of outer annular grooves are formed in the inner surface of the cylindrical portion and a plurality of ball members are accommodated in a ball-accommodating space defined by these annular grooves.

21 Claims, 6 Drawing Sheets

SPINDLE MOTOR

Matter enclosed in heavy brackets [ ] appears in the original patent but forms no part of this reissue specification; matter printed in italics indicates the additions made by reissue.

This is a divisional of co-pending application Ser. No. 480,277 filed on Feb. 15, 1990, now U.S. Pat. No. 5,045,738

BACKGROUND OF THE INVENTION

1. Field of the Invention

The present invention relates to a spindle motor for rotating a recording disk.

2. Description of the Prior Art

In general, a spindle motor comprises a fitting member to be fitted to the frame of the spindle motor, a rotary member rotatably supported by the fitting member via a bearing member, a rotor magnet fitted to the inner surface of the rotary member and a stator fitted to the fitting member in such a manner that it confronts the rotor magnet. A recording disk such as a magnet disk is fitted to the rotary member. In spindle motors of a type whose shaft is fixed, a shaft member is secured to the fitting member, and the rotary member is rotatably fitted to the shaft member via the bearing member. In spindle motors of a type whose shaft rotates, a hollow cylindrical portion is formed in the fitting member and the shaft member is rotatably supported within this hollow cylindrical portion via the bearing member, the rotary member being secured to the thus supported shaft member.

However, in spindle motors of the type described above, the following problems to be overcome arise: since the bearing member is constituted by an inner and outer rings and a spherical member interposed between the inner and outer rings. Therefore, the size of the motor cannot be reduced due to the above-described structure of the bearing member. Furthermore, it is difficult to obtain a satisfactory accuracy in the rotation of the motor.

Furthermore, the spindle motor of the type described above employs a magnetic sealing mechanism or a labyrinth sealing mechanism for the purpose of protecting the surface of the recording disk from grease splashed from the bearing member. However, the employment of the magnetic sealing mechanism or the labyrinth sealing mechanism causes the overall structure of the motor to become too complicated and cost to be inevitably raised.

SUMMARY OF THE INVENTION

A first object of the present invention is to provide a spindle motor exhibiting a satisfactory accuracy in its rotation, which is mechanically simple and, in particular, effective when the size of the motor is desired to be reduced.

A second object of the present invention is to provide a spindle motor which may assuredly prevent entrance of grease or the like into a disk room thereof with a relatively simple structure.

The other objects and features of the present invention will appear more fully from the following description.

DETAILED DESCRIPTION OF THE PREFERRED EMBODIMENTS

Preferred embodiments of a spindle motor according to the present invention will now be described with reference to the drawings.

First Embodiment

Figure 1:
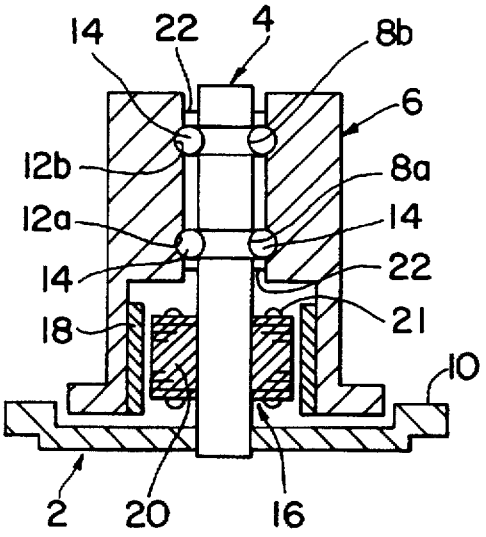
FIG. 1 is a schematic cross sectional view which illustrates a first embodiment of a spindle motor according to the present invention.
Figure 2:
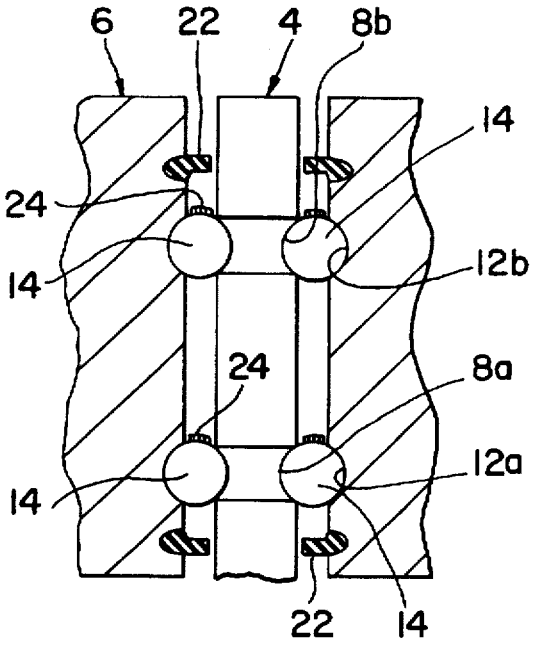
FIG. 2 is a cross sectional view which illustrates an essential portion of the spindle motor shown in FIG. 1.

Referring to FIGS. 1 and 2, a spindle motor comprises a fitting member 2, a shaft member 4 and a rotary member 6. The fitting member 2 may be made of aluminum or the like and fitted to the frame of an operating device (omitted from illustration). The shaft member 4 is in the form of an elongated cylindrical rod and has an end portion (the lower end portion) secured into the fitting member 2 by press-fitting or the like. The shaft member 4 extends substantially perpendicularly upwards from the fitting member 2 and has the other end portion at which the rotary member 6 is rotatably supported.

According to the first embodiment, a pair of inner annular grooves 8a and 8b are formed in the outer surface of the above-described end portion of the shaft member 4 at a certain interval provided in the axial direction. The inner annular grooves 8a and 8b respectively have a substantially semicircular cross sectional shape and run parallel to each other around the shaft member 4. The rotary member 6 is in the form of a substantially cylindrical shape and has an end portion at which a flange portion 10 outwards projecting in the radial direction is formed. The inner diameter of the end portion (the lower end portion) of the rotary member 6 is arranged to be larger than that of the other end portion (the upper end portion). A pair of outer annular groves 12a and 12b are formed in the inner surface of the other end portion of the rotary member 6 at a certain interval provided in the axial direction so as to correspond to the above-described pair of the inner annular grooves 8a and 8b. Also the outer annular grooves 12a and 12b respectively have a substantially semicircular cross sectional shape and run parallel to each other around the inner surface of the rotary member 6.

The thus formed pair of the outer annular grooves 12a and 12 create a pair of ball-accommodating spaces having a substantially circular cross sectional shape in cooperation with the inner annular grooves 8a and 8b formed in the inner surface of the shaft member 4. Thus, a plurality of ball members 14 are movably placed within the corresponding ball-accommodating spaces. As a result, the rotary member 6 is rotatably supported via the thus placed ball members 14. Specifically, the rotary member 6 is made of a magnetic material such as steel and serves as a hub member to which a recording disk such as a magnetic disk is fitted.

According to the first embodiment, a stator 16 and a rotor magnet 18 are placed in a relatively large space defined by the end portion of the rotary member 6. The stator 16 comprises a stator core 20 formed by laminating a plate-like members, the stator core 20 being secured to the outer surface of the end portion of the shaft member 4 by press-fitting or the like. An armature coil 21 is wound around the stator core 20 in a usual manner. The rotor magnet 18 is made of an annular permanent magnet and secured to the inner surface of the end portion of the rotary member 6 by an adhesive or the like in such a manner that the rotor magnet 18 confronts the stator 16. As a result of the thus arranged structure, the rotary member 6 can be rotated in a predetermined direction when power is supplied to the armature coil 21 in a predetermined manner.

According to the first embodiment, sealing members 22 are placed in the outer portion of the pair of the ball-accommodating spaces. That is, one of the sealing member 22 is placed in the outer periphery of the corresponding ball-accommodating space (in the lower portion when viewed in FIGS. 1 and 2) defined by the inner annular groove 8a and the outer annular groove 12a, while the other sealing member 22 is placed in the outer periphery of the other ball-accommodating space (in the upper portion when viewed in FIGS. 1 and 2) defined by the inner annular groove 8b and the outer annular groove 12b. Each of the sealing members 22 is formed in an annular shape and may be made of, for example, synthetic rubber. The thickness of the outer periphery of the sealing member 22 is arranged to be enlarged by a certain degree so that the outer periphery of the sealing member 22 is fitted within the annular groove formed in the inner surface of the rotary member 6. The inner periphery of the sealing member 22 is positioned adjacently to the outer surface of the shaft member 4 so as to prevent the outward spattering of the grease enclosed in the ball-accommodating space. Another structure may be employed in which the inner periphery of the sealing member 22 is positioned in contact with the outer surface of the shaft member 4 with a relatively small pressure. In the case where the spattering of the grease is permitted, the sealing members 22 may be omitted from the structure.

The shaft member 4 and the rotary member 6 may be assembled, for example, as follows: the rotary member 6 is heated by a high frequency heater (omitted from illustration) so as to expand the inner diameter. Then, the rotary member 14 is coupled to the shaft member 4 via the plurality of ball members 14 in a predetermined manner in the state in which the inner diameter has been expanded. Furthermore, the distance between the inner annular grooves 8a and 8b and that between the outer annular grooves 12a and 12b are arranged not to completely coincide with each other. As a result, pressure of a predetermined level can act between the shaft member 4 and the rotary member 6 after the assembling work has been completed as described above. Furthermore, the plurality of the ball members 14, to be accommodated in the corresponding ball-accommodating spaces, are held by ball retaining member 24 at substantially the same intervals. As a result, the ball members 14 can be easily placed and the rotation of the rotary member 6 can be smoothed.

According to the first embodiment, the same expansion coefficient can be obtained when the shaft member 4, the plurality of ball members 14 and the rotary member 6 are made of the same material, for example copper. Therefore, the distances between the elements are not substantially changed even if the temperature has been changed. As a result, the rotation can be stabilized against the temperature change.

According to the first embodiment, the elements, for example, the shaft member 4, the plurality of ball members 14 and the rotary member 6 may be manufactured as an element. In this case, the motor as shown in FIG. 1 can be manufactured by securing the rotor magnet 18 to the inner surface of the rotary member 6 and by securing the stator 16 to the shaft member 4 before securing the end portion of the shaft member 4 into the fitting member 2 by press-fitting or the like.

As can be clearly seen from FIG. 1, the motor according to the first embodiment exhibits a significantly reduced number of the components with respect to that of the conventional motor, causing the assembling work to be completed easily. Furthermore, the size of the motor can be therefore easily reduced. The accumulative dimensional errors taken place in the components can be reduced since the number of the components can be reduced. As a result, satisfactory rotary accuracy can be realized.

Second Embodiment

Figure 4:
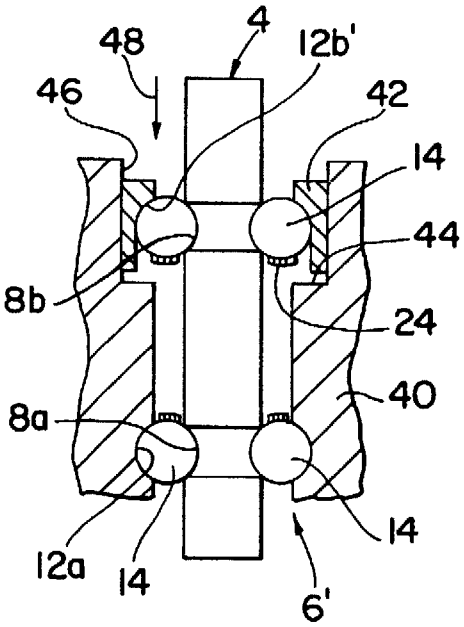
FIG. 4 is a cross sectional view which illustrates an essential portion of the spindle motor shown in FIG. 3.
Figure 3:
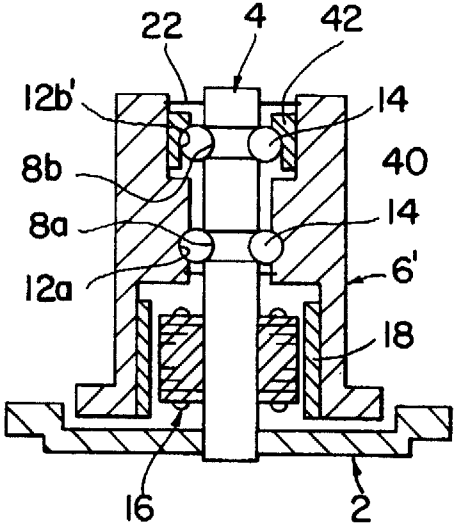
FIG. 3 is a schematic cross sectional view which illustrates a second embodiment of the spindle motor according to the present invention.

FIGS. 3 and 4 show a second embodiment of the spindle motor according to the present invention. An aspect of the spindle motor according to the second embodiment of the present invention lies in an improvement in the rotary member serving as a hub member to which the recording disk is fitted. The same elements as those according to the first embodiment are given the same reference numerals.

Referring to FIGS. 3 and 4, a rotary member 6' comprises a substantially hollow cylindrical rotary body 40 and an annular member 42 to be fitted to the rotary body 40. The inner diameter of an end portion of the rotary body 40 is arranged to be larger than that of the other end portion so that the stator 16 and the rotor magnet 18 are, similarly to the first embodiment, placed in a space thus created at this end portion. A stepped portion 44 (see FIG. 4) is formed on the inner surface of the other end portion of the rotary body 40, the stepped portion 44 being arranged in such a manner that the inner diameter of the other end portion is enlarged. The inner portion of the stepped portion 44 of the rotary body 40 is arranged to have an outer annular groove 12a at a position corresponding to the position of the inner annular groove 8a formed in the shaft member 4. As a result, a space having a substantially circular cross sectional shape for accommodating the balls is created by the cooperation of the inner annular groove 8a and the outer annular groove 12a. The annular member 42 is fitted within a portion 46 having a large diameter after it has been introduced into an opening formed in the other end surface of the rotary body 40. The annular member 42 has a recessed portion whose upper portion is in the form of a circular arc and whose lower portion is in the form of a straight line. The recessed portion serves as another outer annular groove 12b so as to define the other ball-accommodating space in cooperation with the inner annular groove 8b formed in the shaft member 4.

Another structure may be employed in which one of the ball-accommodating spaces is defined by the inner annular groove 8a in the shaft member 4 and the outer annular groove of the annular member 42.

Similarly to the first embodiment, the plurality of ball members 14 are accommodated in the pair of the ball-accommodating spaces defined by the inner annular grooves 8a and 8b and the outer annular grooves 12a and 12b'. A rotary member 6' is rotatably supported via the thus accommodated ball members 14. It is preferable that the ball members 14 be retained by the ball-retaining member 24 similarly to the above-described embodiment.

The rotary member 6' may be coupled in the manner, for example, as follows: first, the rotary body 40 is heated by the high frequency heater (omitted from illustration) so as to enlarge its inner diameter. In this state, the rotary body 40 is fitted to the shaft member 4 in a predetermined manner via the plurality of the ball members 14. Then, the plurality of the ball members 14 are placed in the other inner annular groove 8b. Then, the annular member 42 is inserted in a direction designated by an arrow 48 after it has been introduced through the opening formed in the other surface of the rotary body 40. As a result, the annular member 42 is secured to the inner surface of a large diameter portion 46 of the rotary body 40. The annular member 42 may be secured by, for example, an adhesive or the like under a predetermined load. It may be shrink-fitted as an alternative to the adhesive.

The other structure of the second embodiment is substantially the same as that of the first embodiment shown in FIGS. 1 and 2. Although the structure is complicated to a certain degree since the annular member 42 is employed according to the second embodiment, the same effect in terms of the reduction in the overall size of the motor as that obtained in the first embodiment can be obtained.

Figure 5:
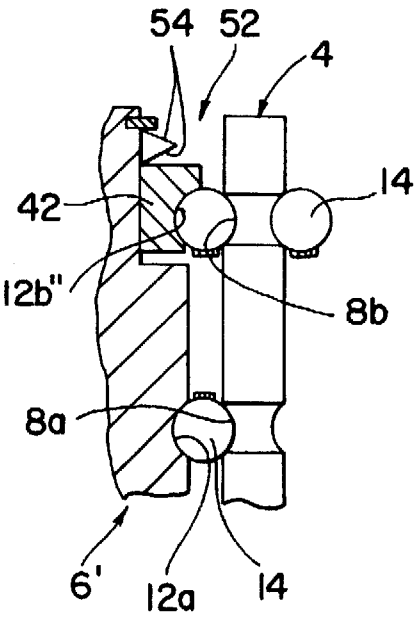
FIG. 5 is a cross sectional view which illustrates an essential portion of a modification to the second embodiment of the spindle motor.

FIG. 5 shows a modification to the above-described second embodiment in which the pressurizing mechanism for applying pressure to the ball members is modified.

Referring to FIG. 5, the annular member 42 is fitted to the inner surface of a portion 46' of the rotary body 40 whose diameter has been enlarged, the annular member 42 being fitted in such a manner that it can move vertically in the axial direction (when viewed in FIG. 5). An outer annular groove 12b" is formed in the inner surface of the annular member 42, the outer annular member 12" defining the ball-accommodating space in cooperation with the inner annular groove 8b of the shaft member 4. The plurality of the ball members 14 are interposed between the outer annular groove 12b" and the inner annular groove 8b.

The pressurizing mechanism according to this modification has urging means 52 acting on the annular member 42. The urging means 52 is constituted by a pair of belleville springs 54. The outer periphery of either of the belleville springs 54 is positioned in contact with the annular member 42 and the other outer periphery of the belleville spring 54 is positioned in contact with a securing member 56 secured to the rotary body 40. The urging means 52 elastically urges the annular member 42 in the downward direction, when viewed in FIG. 5, so that a predetermined pressure is applied between the rotary member 6' and the shaft member 4. The other structure according to this modification is substantially the same as that of the second embodiment shown in FIGS. 3 and 4.

Third Embodiment

Figure 6:
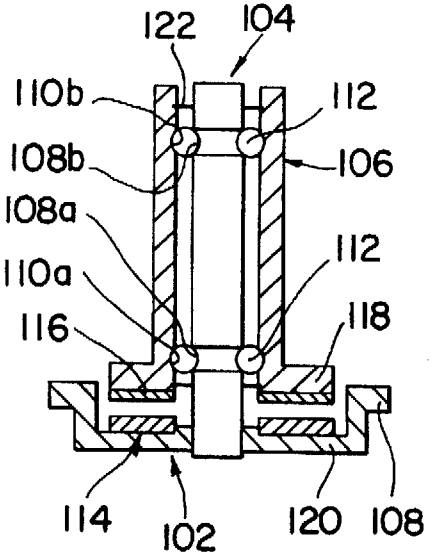
FIG. 6 is a schematic cross sectional view which illustrates a third embodiment of the spindle motor according to the present invention.

FIG. 6 shows a sixth embodiment of the spindle motor according to the present invention. The main difference between the third embodiment and the above described first and second embodiments lies in that the position of the stator and that of the rotor.

Referring to FIG. 6, the spindle motor 6 according to the third embodiment also comprises a fitting member 102, a shaft member 104 and a rotary member 106. The outer periphery of the fitting member 102 projects upwards and has an end of the projection portion in which a flange 108 projecting outwards in the radial direction is formed. The fitting member 102 is fitted to the frame (omitted from illustration) of the operating device similarly to the first embodiment.

An end portion (the lower end portion) of the shaft member 104 is secured to the fitting member 102 by proper means such as press fitting. Similarly to the above-described embodiments, the rotary member 106 is rotatably supported by the shaft member 104. According to the third embodiment, a pair of inner annular grooves 108a and 108b are formed in the outer surface of the two end portions of the shaft member 104. Furthermore, a pair of outer annular grooves 110a and 110b are formed in the inner surface of the two end portions of the rotary member 106 in such a manner that the pair of outer annular grooves 110a and 110b corresponds to the pair of the inner annular grooves 108a and 108b. The above-described inner annular grooves 108a and 108b and the outer annular grooves 110a and 110b define the ball-accommodating spaces respectively having a substantially circular cross section in cooperation with one another. The thus created ball-accommodating spaces accommodate a plurality of ball members 112 so that the rotary member 106 is rotatably supported via the ball members 112.

According to the third embodiment, a stator 114 is fitted to the fitting member 102, and a rotor magnet 116 is fitted to the rotary member 106. An annular flange 118 (to which the recording disk is fitted and secured) projecting outwards in the radial direction is formed at an end portion of the rotary member 106. The plate-like rotor magnet 116 is secured to the lower surface (the lower surface when viewed in FIG. 6) of the flange 118 by an adhesive or the like. The stator 114 has plate-like air-core coils which are positioned at certain intervals in the circumferential direction. The stator 114 is positioned on the inner surface of a body portion 120 of the fitting member 102 in such a manner that it confronts the rotor magnet 116. It is preferable that the sealing members 122 is rotatably supported by the shaft member 102 via the plurality of ball members 112 similarly to the third embodiment.

Figure 7:
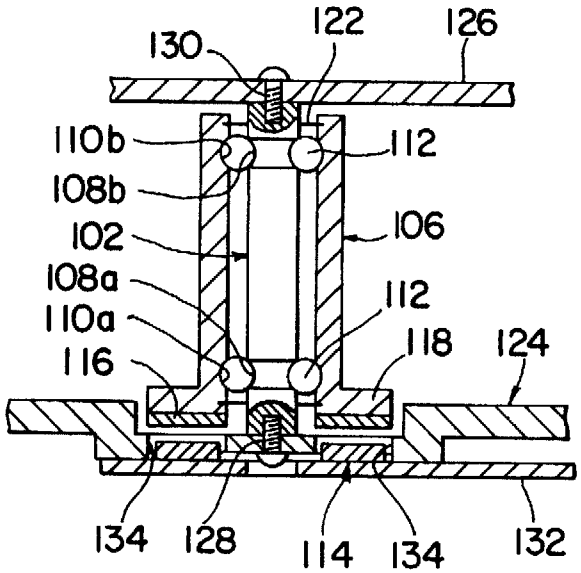
FIG. 7 is a schematic cross sectional view which illustrates a forth embodiment of the spindle motor according to the present invention.

A circuit substrate 132 for operating the motor is disposed outside (in the lower portion when viewed in FIG. 7) the base plate 124. The stator 114 having air-core coils is provided for the circuit substrate 132, and a plurality of penetrating members 134 are formed in predetermined positions in the base plate 124 so as to correspond to the air-core coils so that the air-core coils of the stator 114 are placed in the corresponding penetrating members 134. As a result of the positioning of a portion of the stator 114, that is, the positioning of the air-core coils, the distance between the stator 114 and the rotor magnet 116 fixed to the lower surface of the flange 118 of the rotary member 106 can be shortened. As a result, the efficiency of the motor can be improved.

The other structure of the fourth embodiment are substantially the same as that of the third embodiment. The effect similar to that obtained from the third embodiment can be obtained according to the fourth embodiment.

Figure 8:
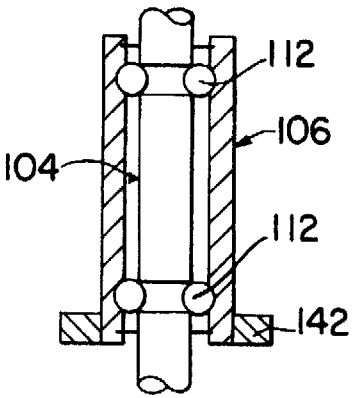
FIG. 8 is a cross sectional view which illustrates an essential portion of a modification to the fourth embodiment of the spindle motor.

It is preferable that the structure as shown in FIG. 8 be employed when the shaft member 102, the ball members 112 and the rotary member 106 are desired to be easily assembled. That is, the structure is constituted by the rotary member 106, a hollow and cylindrical rotary body 140 and an annular member 142 so as to secure the annular member 142 to an end portion of the rotary body 140 by proper means such as press fitting. As a result, the shaft member 102, the ball members 112 and the rotary member 106 can be relatively easily manufactured as a bearing unit. Thus, the spindle motor may be formed by securing the annular member 142 serving as a flange to the thus manufactured bearing unit.

Fifth Embodiment

Figure 9:
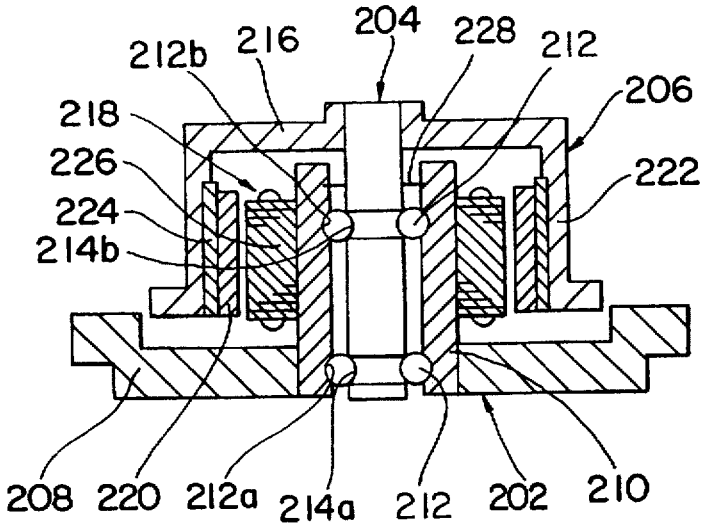
FIG. 9 is a schematic cross sectional view which illustrates a fifth embodiment of the spindle motor according to the present invention.

FIG. 9 shows a fifth embodiment of the spindle motor according to the present invention.

Although the present invention is applied to the motor of the shaft fixed type according to the first and second embodiments, it is applied to a motor of a shaft rotatable type according to the fifth embodiment.

Referring to FIG. 9, the motor according to this embodiment also comprises a fitting member 202, a shaft member 204 and a rotary member 206. The fitting member 202 comprises a fitting body 208 to be fitted to the frame (omitted from illustration) of the operating device and a hollow cylindrical portion 210 extending substantially perpendicularly upwards from the substantial center portion of the fitting body 208. The hollow cylindrical portion 210 is constituted by a sleeve member (it is preferable that it be made of steel) which is independently formed from the fitting body 208, the hollow cylindrical portion 210 being formed by securing an end portion of the sleeve member to the fitting body 208.

The shaft member 208 is positioned in the hollow cylindrical portion 210 and is rotatably supported via a plurality of ball members 212. Outer annular grooves 212a and 212b respectively having a substantially semicircular cross sectional shape are formed in the inner surface at the two end portions of the hollow cylindrical portion 210. Furthermore, inner annular grooves 214a and 214b respectively having a substantially semicircular cross sectional shape are formed at the two end portions of the shaft member 204 so as to confront the above-described pair of the outer annular grooves 212a and 212b. As a result, the above-described outer annular grooves 212a and 212b and the inner annular grooves 214a and 214b define the ball accommodating spaces respectively having a substantially circular cross sectional shape in cooperation with one another. [A] *The* plurality of ball members [216] *212* are, rotatably and movably [along the corresponding to the ball accommodating spaces,] accommodated in the pair of the ball accommodating spaces.

The rotary member 206 serving as a hub member and to which the recording disk is fitted is secured to the shaft member 204 by proper means such as press fitting. Specifically, the shaft member 204 projects upwards (when viewed in FIG. 9) over the hollow cylindrical portion 210 of the fitting member 202. An end wall member 216 of the rotary member 206 is secured to the projection portion. Therefore, the shaft member 204 and the rotary member 206 are rotatable relative to the fitting member 202.

A stator 218 and a rotor magnet 220 are placed in a space covered by the rotary member 206. That is, the annular rotor magnet 220 is fitted to the inner surface of a cylindrical body 222 of the rotary member 206 via a yoke member 224. The stator 218 comprises a stator core 226 formed by laminating a plate-like members and an armature coil wound around the stator core 226. The stator 218 is fitted on the outer surface of the hollow cylindrical portion 210 of the fitting member 202 in such a manner that the stator 218 confronts the rotor magnet 220.

According to the fifth embodiment, a sealing member 228 is placed on either side of the pair of the ball accommodating spaces, that is, a free end portion of the hollow cylindrical portion 210 of the fitting member 202, for the purpose of preventing grease or the like to overflow through an opening at the free end portion of the hollow cylindrical portion 210.

The motor thus arranged may be assembled in a manner for example, as follows: first, the sleeve members such as the shaft member 204, ball members 216 and the hollow cylindrical portion 210 are heated similarly to the first embodiment before they are assembled.

Then, the stator 218 is fitted to the outer surface of the sleeve unit formed as described above, and then an end of the sleeve member is secured to the fitting body 208. Furthermore, the yoke member 224 is fitted to the inner surface of the rotary member 206 and the rotor magnet 220 is fitted to the inner surface of the yoke member 224. Then, the rotary member 206 is secured to the other end portion of the shaft member 204 supported by the fitting member 208. Thus, the structure shown in FIG. 9 can be extremely easily assembled with respect to the conventional motor.

Also according to the fifth embodiment, a similar improvement to that shown in FIGS. 2 to 7 can be realized. That is, a structure may be employed in which the hollow cylindrical portion of the fitting member is constituted by the cylindrical body portion and the annular member and the annular member is secured to the enlarge-inner diameter portion of the cylindrical body portion with pressure of a certain level. The annular member may be elastically urged by urging means as an alternative to the securing of the annular member. In this case, either of the ball-accommodating space is defined by the inner annular groove of the shaft member and the outer annular groove of the annular member. Furthermore, another structure may be employed in which the rotor magnet is fitted to the lower surface of the flange of the rotary member and the stator is placed on the inner surface of the fitting member in such a manner that the stator confronts the rotor magnet.

Sixth Embodiment

Figure 10:
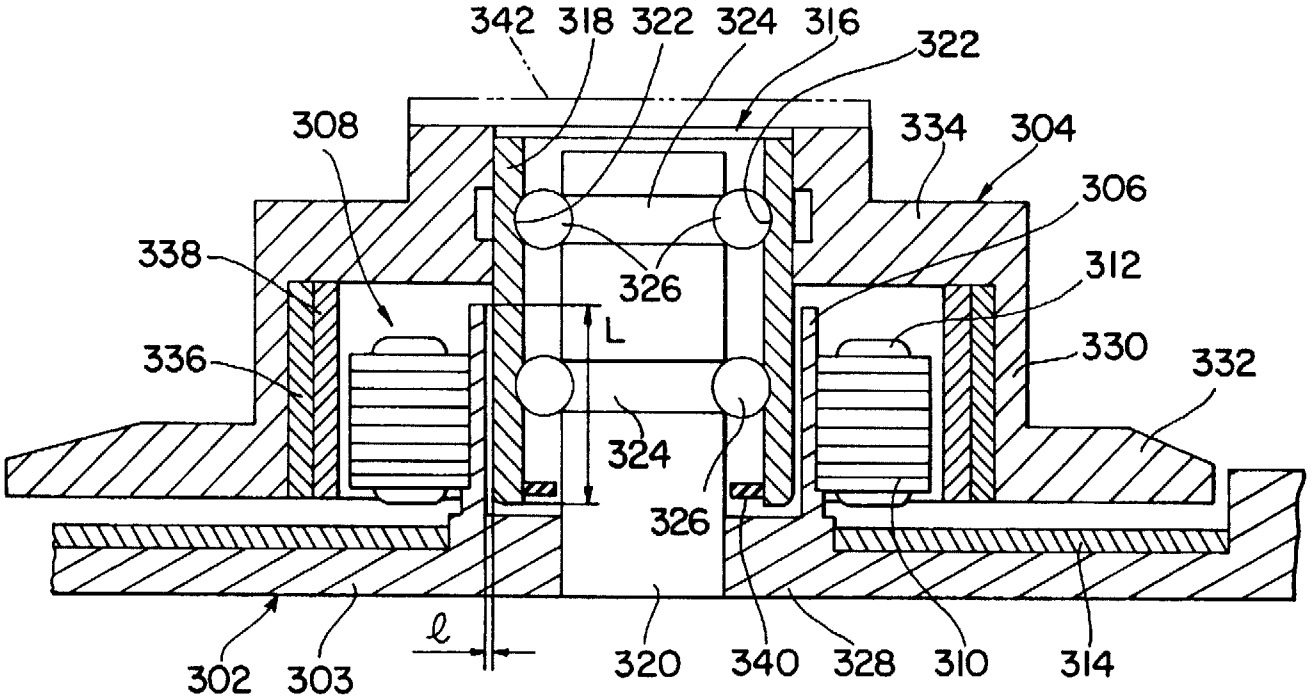
FIG. 10 is schematic cross sectional view which illustrates a sixth embodiment of the spindle motor according to the present invention.

FIG. 10 shows a sixth embodiment of the spindle motor according to the present invention.

Referring to FIG. 10, the spindle motor comprises a fitting member 302 and a substantially cylindrical rotary member 304. The fitting member 302 comprises a substantially disc like fitting body 303. The fitting body 303 has circular holes at the substantial center thereof. Furthermore, a hollow cylindrical portion 306 projecting upwards is integrally formed in the periphery defining the hole, that is, in the inner periphery of the fitting body 303. A stator 308 is fitted to the outer surface of the cylindrical portion 306. The stator 308 comprises a stator core 310 secured to the cylindrical portion 306 and a coil 312 to be wound around the stator core 310. Furthermore, a circuit substrate 314 is placed on the inner surface (on the upper surface when viewed in FIG. 10) of the fitting body 303. An operating circuit (omitted from illustration) including a hole device for controlling the rotation of the rotary member 304 is provided for the circuit substrate 314. Furthermore, a bearing unit 316 is fitted to the fitting member 302. The bearing unit 316 comprises a hollow cylindrical sleeve member 318 (forming the outer ring) and a shaft member 320 disposed in the sleeve member 318.

A pair of outer annular grooves 322 are formed in the inner surface of the sleeve member 318 in the axial direction at a certain interval. On the other hand, a pair of inner annular grooves 324 are formed in the outer surface of the shaft member 320 in such a manner that the inner annular grooves 324 correspond to the above-described pair of the outer annular grooves 322. The outer annular grooves 322 and the inner annular grooves 324 define the pair of ball-accommodating spaces in cooperation with one another. A plurality of ball members 326 are rotatably and movably along the accommodating spaces accommodated in the pair of the ball-accommodating spaces. Therefore, the sleeve member 318 and the shaft member 320 are rotatable with respect to each other via two-lines of a plurality of ball members 326 disposed at certain intervals in the axial direction of the shaft member 320. According to the sixth embodiment, the shaft member 320 is secured to the fitting member 302 and the sleeve member 318 is secured to the rotary member 304. An annular projection 328 is secured to the base portion of the cylindrical portion 306 of the sleeve member 318, projection 328 projecting inwards in the radial direction. An end portion of the projection projeting from an end portion (the lower end portion) of the sleeve member 318 of the bearing unit 320 is secured to the annular projection 328 by proper means such as press fitting or the like. The rotary member 304 comprises a cylindrical body 330, a flange 332 formed at an end portion (the lower end portion) of the cylindrical body 330 and an end wall portion 334 formed at the other end portion (the upper end portion) of the cylindrical body 330. The end wall portion 334 is secured to the other end portion (the upper end portion) of the sleeve member 318 by proper means such as press fitting. The body 330 of the rotary member 304 covers the stator 308 fitted to the cylindrical portion 306 of the fitting member 302. A rotor magnet is fitted to the inner surface of the body 330 of the rotary member 304 via a yoke member 336. A recording disk (omitted from illustration) such as the magnetic disk is fitted to a flange portion 332 of the rotary member 304 serving as a hub member.

The motor according to this embodiment is structured as follows in order prevent adhesion of grease or the like, to be enclosed in the above-described pair or ball-accommodating spaces, to the recording disk (omitted from illustration): the radial distance I between the outer surface of the sleeve member 318 and the inner surface of the cylindrical portion 306 is sufficiently reduced so as to prevent particles of relatively large diameters such as grease. It is preferable that the distance I be 0.3 mm or less in terms of preventing the surface contamination of the recording disk, and preferably, 0.1 mm or less. Furthermore, the distance L which is the distance of overlap between the sleeve member 318 and the cylindrical portion 306 in the radial direction is arranged to be sufficiently large to further effectively prevent the passing of the particles of the type described above. It is preferable that the distance L be 4 mm or more, preferably 6 mm or more. Furthermore, it is preferable that the ratio (L/1) between the distance L and the distance I be about 15 or more, preferably 60 or more. As a result, as can be clearly seen from FIG. 10, the space between the outer surface of the sleeve member 318 and the inner surface of the cylindrical portion 306 acts as a so-called "air curtain" so that the invasion of the particles such as grease through the above-described space can be effectively prevented. As a result of the bearing unit 316 thus structured, the inner surface of the cylindrical portion 306 and the outer surface of the sleeve member 318 which run substantially parallel to each other in the axial direction act to prevent the invasion of the particles such as grease without the necessity of employing a so-called labyrinth structure. According to the sixth embodiment, a sealing member 340 is placed on inner surface of an end portion of the sleeve member 318. The sealing member 240 may be made of, for example, synthetic rubber and has a free end which is positioned near or in contact with the shaft member 320. As a result, the flowing out of the particles such as grease into the above-described space can be prevented. A cap member 342 is fitted to an end wall portion 334 of the rotary member 304 as designated by an alternate long and two short dashes line of FIG. 10. Therefore, the particles such as grease from the other end portion (the end surface opposite to the side on which the sealing member 340 is placed) of the bearing unit 316 can be sealed by the cap member 342. As a result, the recording disk (omitted from illustration) can be protected from the adhesion of the particles such as grease.

Seventh Embodiment

Figure 11:
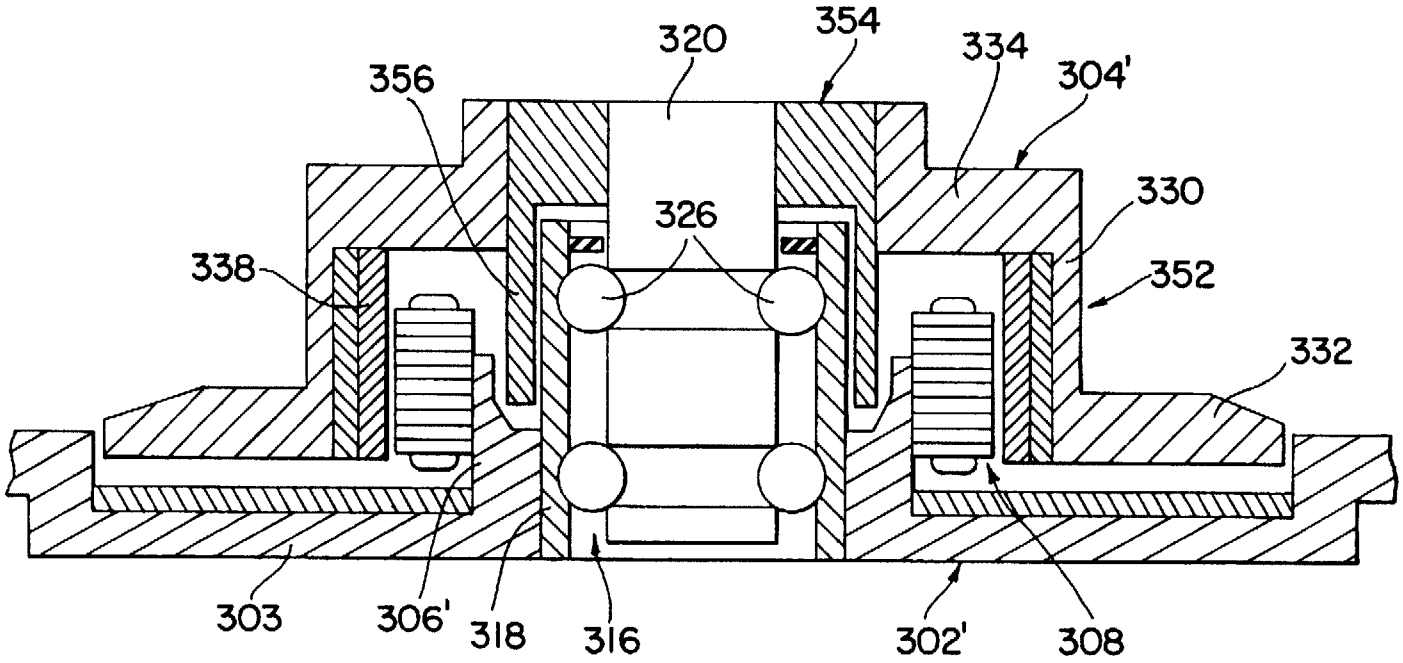
FIG. 11 is schematic cross sectional view which illustrates a seventh embodiment of the spindle motor according to the present invention.

FIG. 11 shows a seventh embodiment of the spindle motor according to the present invention. According to the seventh embodiment, the present invention is applied to the shaft rotatable type motor. The same elements as those shown in FIG. 10 are given the same reference numerals.

Referring to FIG. 11, a short cylindrical portion 306' is integrally formed at the substantial central portion of the fitting body 303 of a fitting member 302'. The stator 308 is fitted to the outer surface of the cylindrical portion 306'. The bearing unit 316 shown in FIG. 11 is structured substantially similarly to that shown in FIG. 10, the sleeve member 318 of the bearing unit 316 being secured to the cylindrical portion 306' by proper means such as press fitting.

On the other hand, a rotary member 304' is constituted by a rotary body 352 and a bush member 354. The rotary body 352 comprises, substantially similarly to that shown in FIG. 10, the cylindrical body 330, the flange 332 and the end wall portion 334. The end wall portion 334 is secured to a projection end projecting over the sleeve member 318 of the bearing member 320 via the bush member 354.

According to the seventh embodiment, a hollow cylindrical wall 356 extending in the axial direction is integrally formed with the bush member 354. The space between the inner surface of the hollow cylindrical wall 356 and the outer surface of the sleeve member 318 serves as a so-called air curtain. That is, the relationship between the hollow cylindrical wall 356 and the sleeve member 318 of the bearing unit 316 is substantially the same as the relationship between the cylindrical portion 306 of the fitting member 302 and the sleeve member 318 of the bearing unit 316. Therefore, a similar effect can be obtained according to the seventh embodiment to that obtained from the sixth embodiment.

Although the invention has been described in its preferred form with a certain degree of particularly, it is understood that the present disclosure of the preferred from has been changed in the details of construction and the combination and arrangement of parts may be resorted to without departing from the spirit and the scope of the invention as hereinafter claimed.

We claim:

1. A spindle motor comprising a fitting member, a shaft member secured to said fitting member, a rotary hub member disposed about said shaft member for carrying a recording disk thereabout and for rotation relative to said shaft member, said rotary hub member comprising a rotary body and an annular member fitted to the inner surface of said body, a rotary magnet fitted to said rotary hub member and a stator positioned in such a manner as to confront said rotor magnet, wherein:

a pair of inner annular grooves are formed directly in the outer surface of said shaft member;

[at least one] *a first* outer annular groove is formed directly in the inner surface of said annular member in such a manner as to confront one of said pair of inner annular grooves;

*a second outer annular groove is formed directly in the inner surface of said hub member in such a manner as to confront other of said pair of inner annular grooves;* said pair of inner annular grooves and said *first and second* outer annular grooves define [at least one] *a pair of* ball-accommodating annular spaces; *and* a plurality of ball members are rotatably and movably accommodated in said ball-accommodating annular space.

2. A spindle motor according to claim 1, wherein said annular member is secured to said rotary body in a state in which a predetermined load is applied to the other one of said pair of inner annular grooves.

3. A spindle motor according to claim 1, wherein said annular member is movably fitted to the inner surface of said rotary body and means for urging said annular member toward the other one of said pair of inner annular grooves is provided.

4. A spindle motor comprising a fitting body, a fitting member projecting substantially perpendicularly from said fitting body and having a hollow cylindrical portion comprising a cylindrical body and an annular member fitted to the inner surface of the cylindrical body, a shaft member disposed in said annular member and rotatable relative thereto, a rotary member for carrying a recording disk thereabout secured to said shaft member, a rotor magnet fitted to said rotary member and a stator disposed in such a manner as to confront said rotor magnet, wherein:

a pair of inner annular grooves are formed directly in the outer surface of said shaft member;

[at least one] *a first* outer annular groove is formed directly in the inner surface of said annular member in such a manner as to correspond to one of said pair of inner annular grooves;

*a second outer annular groove is formed directly in the inner surface of said cylindrical body in such a manner as to correspond to other of said pair of inner annular grooves;* said pair of inner annular grooves and said [of] *first and second* outer annular grooves [device at least one] *define a pair of* ball-accommodating annular spaces; and a plurality of ball members are rotatably and movably [placed] *accommodated* in said *pair of* ball-accommodating annular spaces.

5. A spindle motor according to claim 4, wherein said annular member is secured to said cylindrical body in a state where a predetermined load is applied to the other one of said pair of inner annular grooves.

6. A spindle motor according to claim 4, wherein said annular member is fitted to the inner surface of said cylindrical body in such a manner that said annual member is movable in the axial direction, and means for urging said annular member toward the other one of said pair of inner annular grooves is provided.

7. A spindle motor according to claim 4, wherein a sealing member is placed between the positions at which said pair of ball-accommodating spaces are placed and the position at which said rotary member is placed.

8. A spindle motor according to claim 4, wherein said rotary member is a hub member to which a recording disk is fitted.

*9. A spindle motor comprising a fitting member, a shaft member secured to said fitting member, a rotary hub member disposed about said shaft member for carrying a recording disk and for rotation relative to said shaft member, an annular member supported on one of said shaft member and said rotary hub member, a rotary magnet fitted to said rotary hub member, and a stator positioned in such a manner as to confront said rotary magnet, wherein:*

*a pair of axially spaced annular grooves are formed directly in the surface of the other of said shaft member and said rotary hub member;*

*a first opposing annular groove is formed directly in the surface of said annular member in such a manner as to confront one of said pair of axially spaced annular grooves;*

*a second opposing annular groove is formed directly in the surface of the one of said shaft member and said rotary hub member supporting the annular member to confront the other of said pair of axially spaced annular grooves;*

*one of said pair of axially spaced annular grooves and said first opposing annular groove in said annular member define a first ball-accommodating annular space;*

*the other of said pair of axially spaced annular grooves and said second opposing annular groove define a second ball-accommodating annular space; and*

*a plurality of ball members are rotatably and moveable accommodated in said first and second ball-accommodating annular spaces.*

*10. A spindle motor according to claim 9, wherein said annular member is secured to one of said shaft member and said rotary hub member in a state in which a predetermined load is applied to the other one of said pair of axially spaced annular grooves.*

*11. A spindle motor according to claim 9, wherein said annular member is moveable fitted to one of said shaft member and said rotary hub member and means for urging said annular member toward the other one of said pair of annular grooves is provided.*

*12. A spindle motor comprising a fitting body, a fitting member projecting substantially perpendicularly from said fitting body and having a hollow cylindrical portion, a shaft member disposed in said hollow cylindrical portion and rotatable relative thereto, a rotary hub member secured to said shaft member for carrying a recording disk, an annular member fitted to one of said fitting member and said shaft member, a rotary magnet fitted to said rotary hub member, and a stator positioned in such a manner as to confront said rotary magnet, wherein:*

*a pair of axially spaced annular grooves are formed directly in the surface of one of said fitting member and said shaft member;*

*a first opposing annular groove is formed directly in the surface of said annular member in such a manner as to confront one of said pair of annular grooves;*

*a second opposing annular groove is formed directly in the surface of the one of said fitting member and said shaft member supporting the annular member to confront the other of said pair of axially spaced annular grooves;*

*one of said pair of annular grooves and said first annular groove in said annular member define a first ball-accommodating space;*

*the other of said pair of axially spaced annular grooves and said second opposing annular groove define a second ball-accommodating annular space; and*

*a plurality of ball members are rotatably and movably accommodated in said first and second ball-accommodating spaces.*

*13. A spindle motor according to claim 12, wherein said annular member is secured to one of said fitting member and said shaft member in a state in which a predetermined load is applied to the other one of said pair of axially spaced annular grooves.*

*14. A spindle motor according to claim 12, wherein said annular member is movably fitted to one of said fitting member and said shaft member and means for urging said annular member toward the other one of said pair of annular grooves is provided.*

*15. A spindle motor according to claim 12, wherein said annular member is supported by said fitting member.*

*16. A spindle motor comprising a shaft member, a rotary hub member disposed about said shaft member for carrying a recording disk, and a fitting member, said rotary hub member and said fitting member rotatable relative to one another, said shaft member secured to one of said fitting member and said rotary hub member, an annular member supported on one of said shaft member, said rotary hub member, and said fitting member, a rotary magnet fitted to said rotary hub member, and a stator positioned in such a manner as to confront said rotary magnet, wherein:*

*a pair of axially spaced annular grooves are formed directly in the surface of another of said shaft member, said rotary hub member, and said fitting member rotatable relative to said one member supporting said annular member;*

*a first opposing annular groove is formed directly in the surface of said annular member in such a manner as to confront one of said pair of axially spaced annular grooves;*

*a second opposing annular groove is formed directly in the surface of the one of said shaft member, said rotary hub member, and said fitting member supporting the annular member to confront the other of said pair of axially spaced annular grooves;*

*one of said pair of axially spaced annular grooves and said first opposing annular groove in said annular member define a first ball-accommodating annular space;*

*the other of said pair of axially spaced annular grooves and said second opposing annular groove define a second ball-accommodating annular space; and*

*a plurality of ball members are rotatably and moveable accommodated in said first and second ball-accommodating annular spaces.*

*17. A spindle motor according to claim 16, wherein said annular member is secured to one of said shaft member, said rotary hub member and said fitting member in a state in which a predetermined load is applied to the other one of said pair of axially spaced annular grooves.*

*18. A spindle motor according to claim 16, wherein said annular member is moveable fitted to one of said shaft member, said rotary hub member and said fitting member and means for urging said annular member toward the other one of said pair of axially spaced annular grooves is provided.*

*19. A spindle motor according to claim 16, wherein said annular member is supported by said rotary hub member.*

*20. A spindle motor according to claim 16, wherein said annular member is supported by said fitting member.*

*21. A spindle motor according to claim 16, wherein said rotary hub member has a diametrically enlarged portion, and said annular member is supported by said diametrically enlarged portion.*

* * * * *